United States Patent
Mayer

(10) Patent No.: US 6,761,484 B2
(45) Date of Patent: Jul. 13, 2004

(54) CRANKSHAFT FOR AN INTERNAL COMBUSTION ENGINE DISPOSED IN A MOTOR VEHICLE

(75) Inventor: Kai Martin Mayer, St. Augustin (DE)

(73) Assignee: Ford Global Technologies, LLC, Dearborn, MI (US)

( * ) Notice: Subject to any disclaimer, the term of this patent is extended or adjusted under 35 U.S.C. 154(b) by 80 days.

(21) Appl. No.: 10/065,117

(22) Filed: Sep. 18, 2002

(65) Prior Publication Data

US 2003/0053725 A1 Mar. 20, 2003

(30) Foreign Application Priority Data

Sep. 18, 2001 (EP) .............................................. 01122260

(51) Int. Cl.⁷ ................................................ F16C 9/02
(52) U.S. Cl. ...................................... 384/294; 384/429
(58) Field of Search ................................ 384/294, 429, 384/432, 433

(56) References Cited

U.S. PATENT DOCUMENTS

| | | |
|---|---|---|
| 5,028,281 A | 7/1991 | Hayes et al. |
| 5,082,507 A | 1/1992 | Curry |
| 5,501,529 A * | 3/1996 | Cadle et al. ................. 384/432 |
| 5,522,949 A * | 6/1996 | Widmer et al. ............. 148/321 |
| 6,009,980 A * | 1/2000 | Hester ....................... 188/18 R |
| 6,258,180 B1 * | 7/2001 | Wilde et al. ................. 148/321 |
| 6,543,334 B2 * | 4/2003 | Yamauchi ................... 384/294 |

FOREIGN PATENT DOCUMENTS

| | | |
|---|---|---|
| EP | 0363159 B1 | 7/1992 |
| EP | 0968868 A1 | 1/2000 |
| JP | 61-252912 | 11/1986 |
| JP | 62-253749 | 11/1987 |
| JP | 04-050509 | 2/1992 |
| JP | 05-078735 | 3/1993 |

\* cited by examiner

*Primary Examiner*—Thomas R. Hannon
(74) *Attorney, Agent, or Firm*—Diana D. Brehob

(57) ABSTRACT

The invention relates to a crankshaft bearing for a motor vehicle, in which a crankshaft 1 produced from ADI (austempered ductile iron, DIN EN 1564) is supported on an engine block 2 produced from aluminum without the interposition of other components. There is very little difference between the thermal expansion coefficients between ADI and aluminum materials, ensuring that the bearing operates reliably even when there are fluctuations in temperature.

10 Claims, 1 Drawing Sheet

CRANKSHAFT FOR AN INTERNAL COMBUSTION ENGINE DISPOSED IN A MOTOR VEHICLE

BACKGROUND OF INVENTION

1. Field of the Invention

The invention relates to a crankshaft bearing for a motor vehicle with a first bearing surface on the engine side and a second bearing surface on the crankshaft side, the latter surface being disposed in a sliding manner on the first.

2. Background of the Invention

In internal combustion engines, the crankshaft is used to convert the upward and downward motion of the pistons of the engine into a continuous rotary motion. For this purpose, the crankshaft is supported in the engine block allowing rotary motion. In the prior art, this is accomplished by means of first bearing surfaces, which are connected directly or indirectly to the engine block, and second bearing surfaces, which are connected directly or indirectly to the crankshaft, the surfaces sliding on one another.

Since most engine blocks are typically produced from aluminum and most crankshafts are produced from steel or spheroidal graphite iron, the crankshaft bearings are subject to temperature-dependent clearance due to the different thermal expansion coefficients of these materials.

At high engine temperatures, this clearance increases, potentially leading to disadvantageous oil leakage. If the temperatures are very low when the engine is started, on the other hand, the crankshaft may stick in the crankshaft bearing. One way of mitigating these problems is to use special bearing sleeves between the crankshaft and the engine block, these being composed in part of aluminum and in part of steel. The disadvantage with this solution, however, is the increased outlay for additional components and the additional weight of the steel elements.

SUMMARY OF INVENTION

The present invention provides a crankshaft bearing of simple and low-cost construction, which is functionally reliable under all operating temperature. The crankshaft bearing, according to the invention, for a motor vehicle has a first bearing surface on the engine side and a second bearing surface on the crankshaft side, the latter surface sliding on the first. It is distinguished by the fact that the first bearing surface is composed completely or partially of aluminum and the second bearing surface is composed completely or partially of ADI.

ADI is a cast iron containing spheroidal graphite, the abbreviation ADI standing for austempered ductile iron and the corresponding term in DIN EN 1564 being bainitic cast iron. In the automotive sector, the literature contains references to the use of ADI for a drive shaft component, for example, (EP 0 968 868 A1), for a camshaft (U.S. Pat. No. 5,028,281), and for a differential (U.S. Pat. No. 5,082,507). It has also been found possible to use ADI as a material for the bearing surface of a crankshaft if the corresponding bearing surface on the engine block is composed completely or partially of aluminum. In particular, it is possible with this combination of materials to obtain a crankshaft bearing that is robust in relation to temperature fluctuations, exhibiting neither oil leakage at high temperatures nor jamming at low temperatures.

One particular advantage of this combination of materials is that the first bearing surface, on the engine side, can be of one-piece construction with the engine block since engine blocks are generally likewise produced completely or partially from aluminum. It is therefore not necessary to provide a separate component or change the material to provide the first bearing surface.

Another advantage with the combination of materials envisaged is that the second bearing surface, on the crankshaft side, can also be of one-piece construction with the crankshaft. This means that the entire crankshaft can be made from ADI, and this likewise allows the elimination of additional components and hence a reduction in costs.

It is particularly advantageous if the abovementioned configurations are combined, that is to say the first bearing surface is of one-piece construction with the engine block and the second bearing surface is of one-piece construction with the crankshaft. This makes it possible to dispense completely with additional components, such as bearing sleeves, thereby minimizing both production costs and the weight of the crankshaft bearing.

Regarding the types and compositions available, the aluminum of the first bearing surface and the ADI of the second bearing surface are advantageously chosen so that the thermal expansion coefficients of the materials differ by less than 10%, preferably by less than 6%, from one another. Such small deviations between the thermal expansion coefficients ensure that the crankshaft bearing operates reliably over the entire temperature range encountered in practice.

The above advantages, other advantages, and features of the present invention will be readily apparent from the following detailed description of the preferred embodiments when taken in connection with the accompanying drawings.

BRIEF DESCRIPTION OF DRAWINGS

The invention is explained in greater detail below by way of example with the aid of FIG. 1.

DETAILED DESCRIPTION

Figure 1:
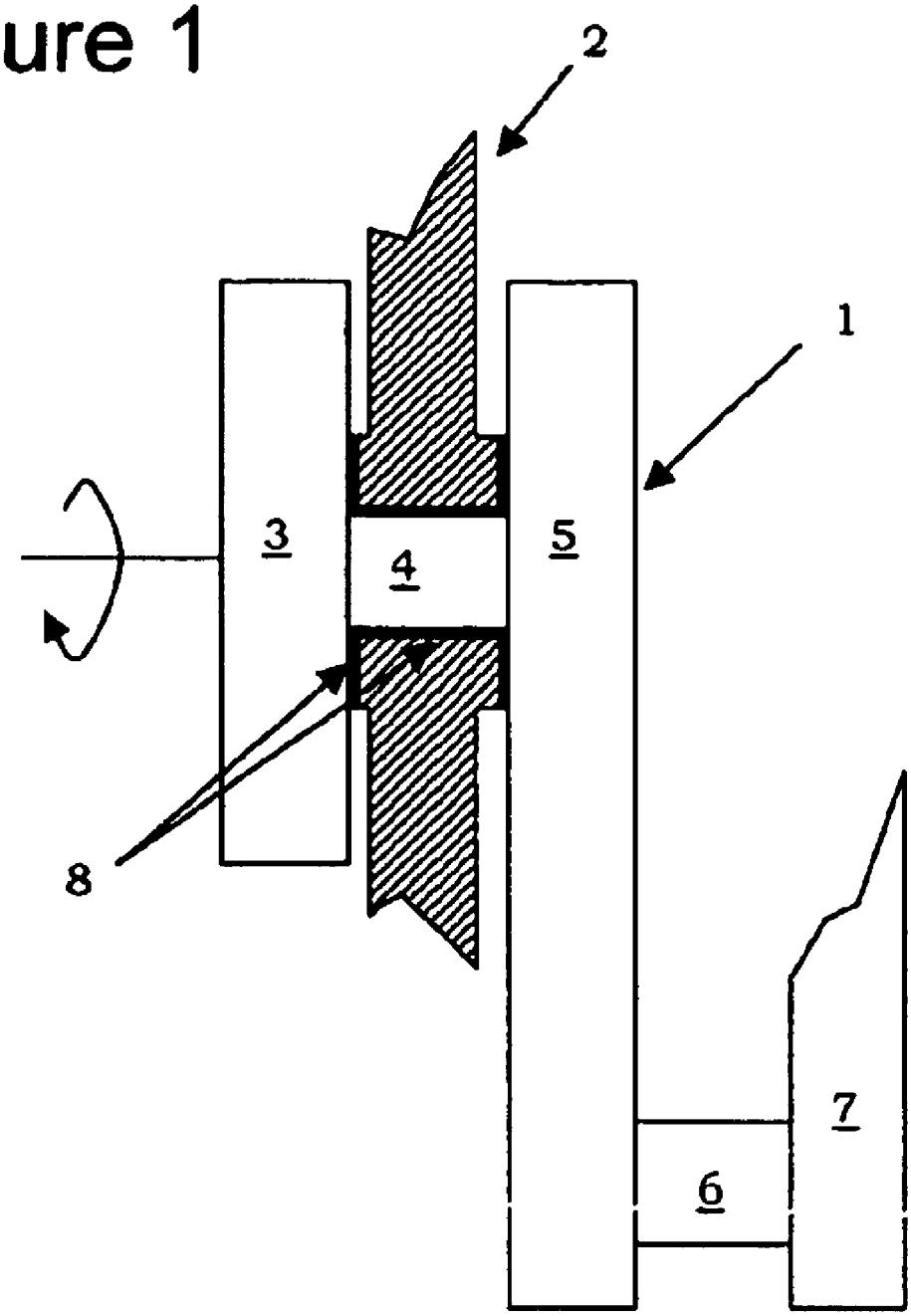
FIG. 1 shows schematically a section through a crankshaft bearing.

The Figure shows the mounting of a crankshaft 1 on an engine block 2, said parts being shown only in cross section. The crankshaft comprises, in a known manner, an end block 3, which is connected to a crank web 5 by a main journal 4. The crank webs, for its part, is connected to the next crank web 7 by a rod journal 6, which connects to the piston's connecting rod (not shown).

The main journal 4 sits in the engine block 2. Radial support for crankshaft 1 on engine block 2 is provided between the main journal 4 and adjoining surfaces 8 of engine block 2. Axial support for crankshaft 1 relative to engine block 2 is provided by adjoining surfaces 8 for end block 3 to engine block 2 and for crank web 5 to engine block 2. Bearing surfaces of engine block 2, which are in contact with crankshaft 1, are collectively referenced by reference numeral 8.

In the prior art, various components, such as bearing sleeves of special materials, which are provided between crankshaft 1 and engine block 2. Additional components of this kind are dispensed with in the case of the crankshaft bearing according to the invention illustrated in FIG. 1. High functional reliability is nevertheless achieved, according to the present invention, by choosing suitable materials for engine block 2 and for crankshaft 1. In particular, engine block 2 can be based on aluminum, as in the case of the Ford Zetec SE engine, for example. By contrast, crankshaft 1 is produced from ADI. The ADI material, which is defined in DIN EN 1564, has a matrix structure composed of carbon-rich austenite incorporating bainitic ferrite needles. In the production of this material, unalloyed or only low-alloy cast iron containing spheroidal graphite is subjected to a subsequent heat treatment referred to as bainitizing or austempering. The heat treatment includes complete austenitization of the casting at temperatures between 850° C. and 950° C. The material is then quenched to 250° C. to 400/450° C. in a salt bath to prevent transformation of the austenite to pearlite.

The thermal expansion coefficient of aluminum used to produce an engine block 2 is typically $18 \times 10^{-7}$ K$^{-1}$. The thermal expansion coefficient of a typical ADI material, is $17 \times 10^{-7}$ K$^{-1}$, i.e., very close to that of aluminum. When these two materials bear against each other, as shown in the Figure, fluctuation in bearing clearance due to temperature change is very small. This ensures no oil leakage due to increased clearance at high engine temperatures and that the crankshaft does not jam in the crankshaft bearing at very low temperatures.

While several modes for carrying out the invention have been described in detail, those familiar with the art to which this invention relates will recognize alternative designs and embodiments for practicing the invention. The above-described embodiments are intended to be illustrative of the invention, which may be modified within the scope of the following claims.

I claim:

1. A crankshaft bearing for an internal combustion engine having a first bearing surface on a block of the engine and a second bearing surface on a crankshaft side, the first bearing surface sliding on the second bearing surface wherein the first bearing surface is composed mostly of aluminum and the second bearing surface is composed mostly of austempered ductile iron (ADI).

2. The crankshaft bearing of claim 1 wherein the first bearing surface is of one-piece construction with the engine block.

3. The crankshaft bearing of claim 2 wherein the second bearing surface is of one-piece construction with the crankshaft.

4. The crankshaft bearing of claim 1 wherein the second bearing surface is of one-piece construction with the crankshaft.

5. The crankshaft bearing of claim 1 wherein the first bearing surface and the second bearing surface have thermal expansion coefficients that differ by less than 10% from one another.

6. The crankshaft bearing of claim 1 wherein the first bearing surface and the second bearing surface have thermal expansion coefficients that differ by less than 6% from one another.

7. A crankshaft bearing for an internal combustion engine having a first bearing surface on a block of the engine and a second bearing surface on a crankshaft side, wherein the first bearing surface slides on the second bearing surface and the first bearing surface and the second bearing surface have thermal expansion coefficients that differ by less than 10% wherein the first bearing surface is composed mostly of aluminum.

8. The crankshaft bearing of claim 7 wherein the second bearing surface is composed mostly of austempered ductile iron (ADI).

9. The crankshaft bearing of claim 7 wherein the first bearing surface is integral to the engine block.

10. The crankshaft bearing of claim 7 wherein the second bearing surface is integral to the crankshaft.

* * * * *